United States Patent [19]
Lamson

[11] Patent Number: 6,093,010
[45] Date of Patent: Jul. 25, 2000

[54] LIP ROLLING MACHINE WITH IMPROVED OVEN MOUNTING AND ADJUSTABLE GUIDE RODS

[75] Inventor: Wayne W. Lamson, Beaverton, Mich.

[73] Assignee: Brown Machine, LLC, Beaverton, Mich.

[21] Appl. No.: 09/203,912

[22] Filed: Dec. 2, 1998

[51] Int. Cl.$^7$ ..................................................... B29C 53/84
[52] U.S. Cl. ........................... 425/188; 425/392; 425/384; 425/329; 264/297.4; 264/297.8
[58] Field of Search ..................................... 425/391, 392, 425/329, 384, 182, 188; 264/296, 297.4, 297.8

[56] References Cited

U.S. PATENT DOCUMENTS

| | | | |
|---|---|---|---|
| 3,363,283 | 1/1968 | Weber | 425/329 |
| 3,579,737 | 5/1971 | Gerber | 425/394 |
| 3,914,102 | 10/1975 | Brown | 425/392 |
| 3,920,373 | 11/1975 | Brown | 425/392 |
| 4,235,579 | 11/1980 | Kurz et al. | 425/174.4 |
| 4,391,768 | 7/1983 | Arends et al. | 425/391 |
| 5,118,277 | 6/1992 | Padovani | 425/384 |

*Primary Examiner*—Robert Davis
*Assistant Examiner*—Thukhanh T. Nguyen
*Attorney, Agent, or Firm*—John R Benefiel

[57] ABSTRACT

A lip rolling machine for thermoformed containers in which the rim heating oven is mounted to be swingable out of its operative position for ready access to the machine components for servicing or set up. The oven is also readily detachable to be removed for convenient servicing of the oven. Guide rod adjustment mechanisms are provided for each end of the guide rods allowing the guide rod spacing at each end to be adjusted by radial in unison movement of the ends by a series of pivoting interlinked arms moved by a handle integral with one arm in each series. A stop arrangement including a threaded rod, and Bridgeport clamps positively secures each handle in an adjusted position. An adjustable transition conveyor is provided at the entrance of the machine with one end raisable by pivoting about a drive pulley axis at the other end to accommodate different sizes of containers.

27 Claims, 10 Drawing Sheets

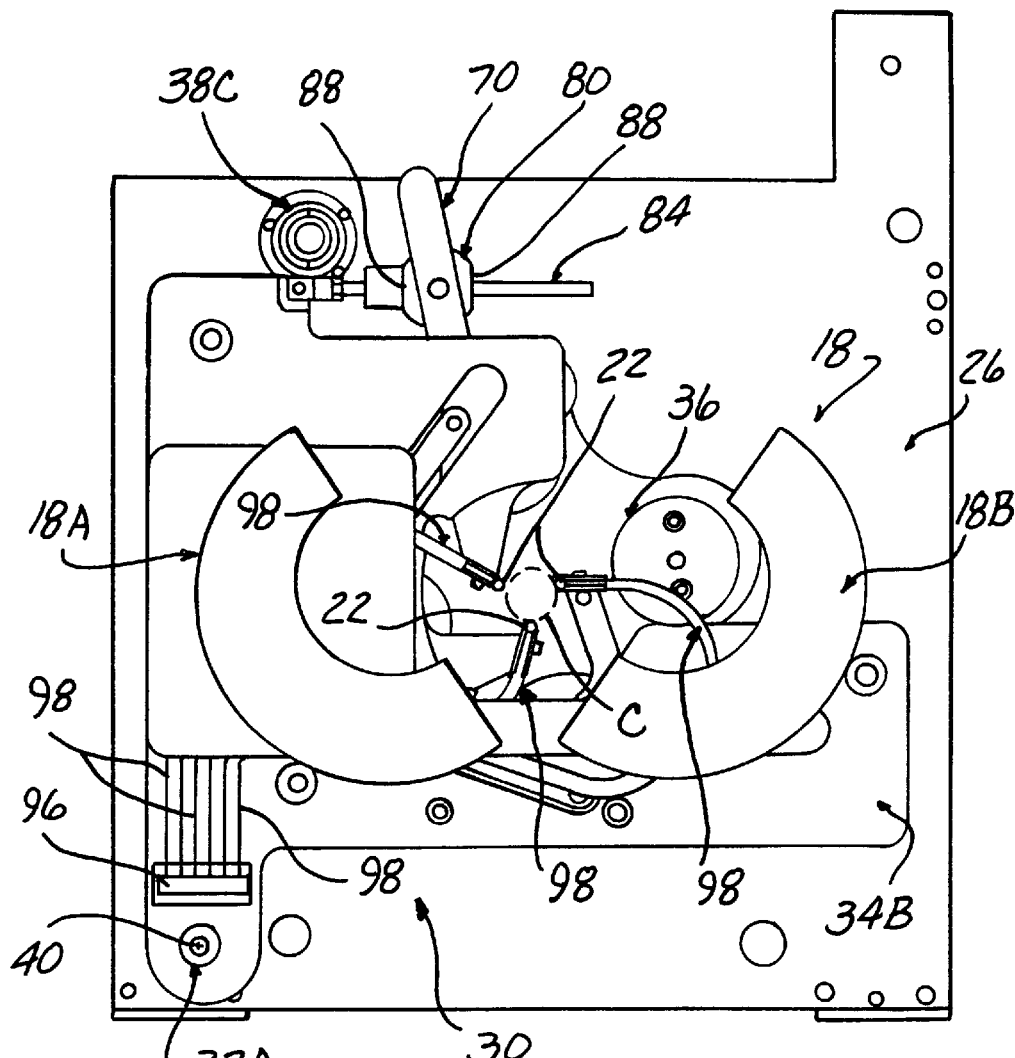
FIG. 2
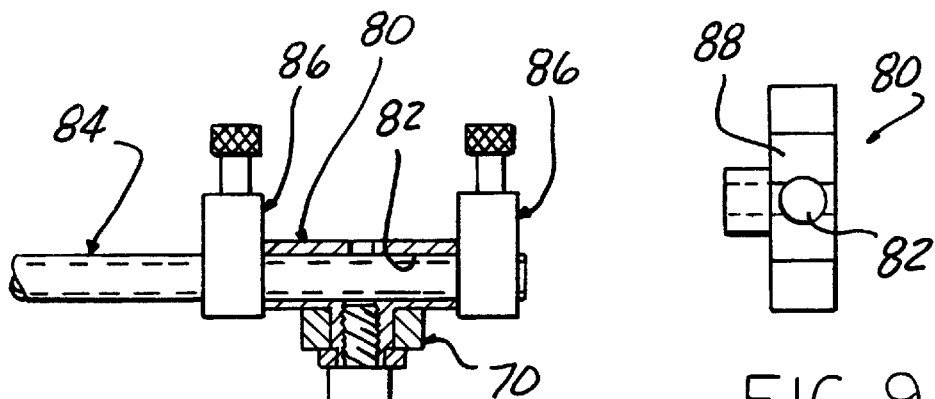
FIG. 8
FIG. 9

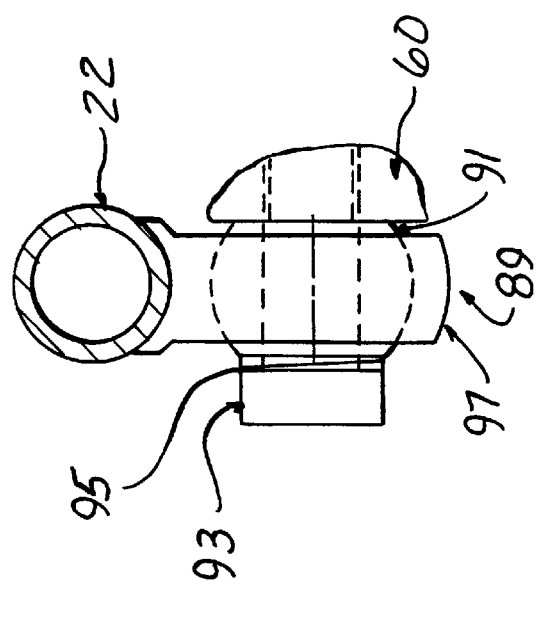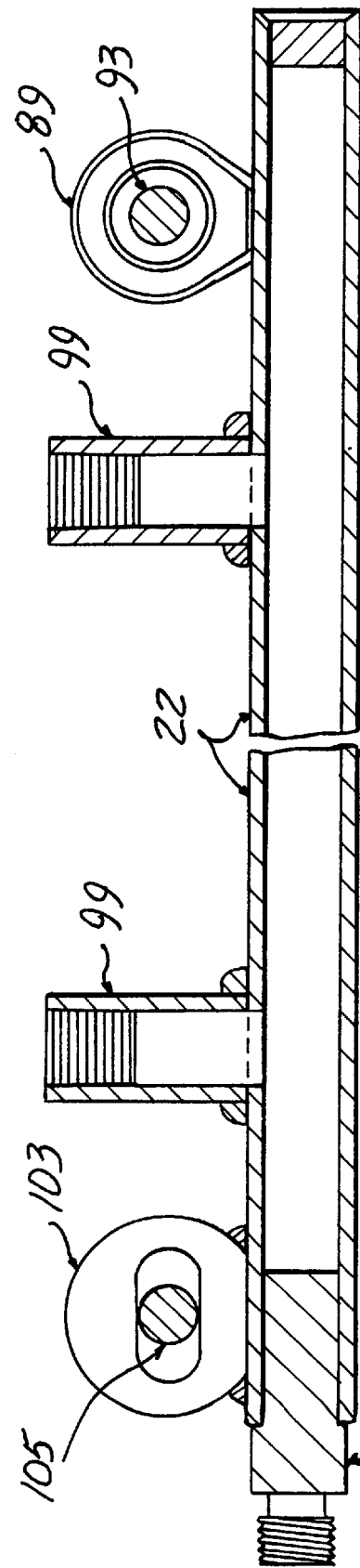
FIG. 4B
FIG. 4A

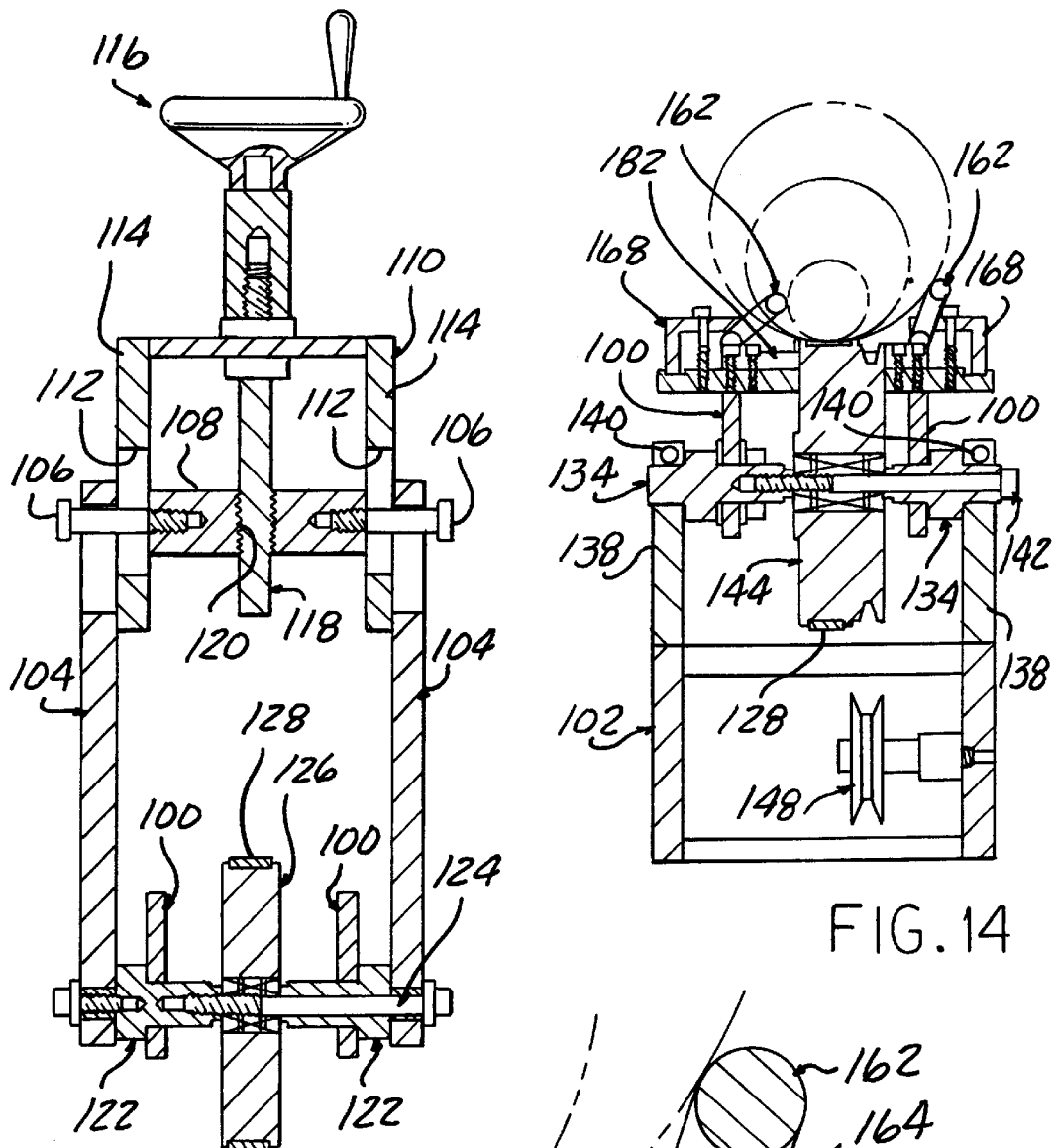
FIG. 13
FIG. 14
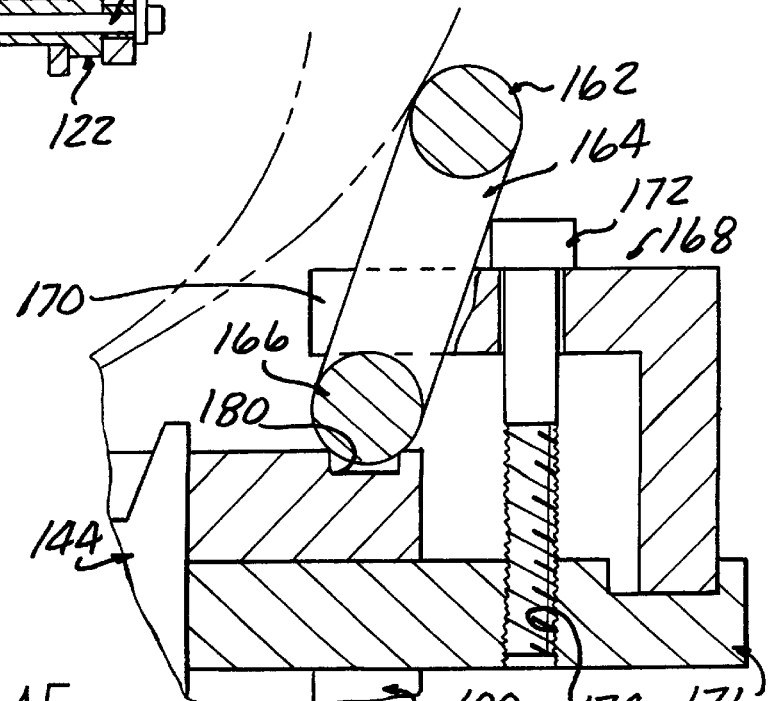
FIG. 15

LIP ROLLING MACHINE WITH IMPROVED OVEN MOUNTING AND ADJUSTABLE GUIDE RODS

BACKGROUND OF THE INVENTION

This invention concerns lip rolling or curling machines, which are widely used for forming a lip on the rim of thermoformed plastic containers, such as disposable cups, food packages, etc. The basic design for these machines has remained unchanged for many years, and is described in U.S. Pat. No. 3,337,919 issued on Aug. 29, 1967 for a "Container Rim Bending Apparatus". In this machine a train of nested cups or other containers is fed into a transition conveyor, which feeds the cups into the circular space between a set of rotating feed rollers, which rollers engage the cup rims and rotate the cup stack. A slight tilt of the rollers out of a radial plane causes the cups to also be advanced into the machine at a speed corresponding to the rate of roller rotation and the degree of tilt of the feed rollers.

The cups are thereby advanced into the interior of a heating oven, confined within a set of three guide rods as the cups are advanced through the oven. After exiting the oven, the train of nested cups is directed into a circular space between a set of rotating curling screws, which engage the heated rims of the cups and progressively form the same to create a lip on the rim of each cup, a helical groove on each curling screw collectively carrying out the forming process as each cup is advanced by the groove engagement past the curling screws.

While this basic design is quite effective and has been widely and successfully used for many years, each of these components as heretofore produced has significant drawbacks, particularly for machines which are adjustable to accommodate different cup sizes and shapes.

In copending applications U.S. Ser. No. 09/203,897 filed on Dec. 2, 1998 Attorney Docket No. BON-111 and U.S. Ser. No. 09/203,896 filed on Dec. 2, 1998 Attorney Docket No. BON-111-1, there is described and claimed improved feed roller and curling screw mechanisms respectively, which renders adjustments thereof much quicker and easier, as well as avoiding shifting of the center point of the spacing between the rollers and screws respectively.

A significant disadvantage of prior heating oven mountings is that the oven cannot easily be removed for servicing, or to access other components for adjustments or servicing. Sometimes, a lengthy delay is involved while waiting for the oven to cool sufficiently to work on parts of the machine close to the oven.

The guide rod set which extends through the oven and guides the containers must likewise be adjusted to each cup size, and heretofore each rod in the set was adjusted separately. This inevitably resulting in misalignment of the center axis of the guide rod with the circular space between the feed rollers and/or the curling screws, which misalignment in turn limited the rate at which the cups could be processed by the machine.

Also, the effect of a given adjustment could not be determined until the machine was restarted, since it must be stopped during the making of adjustments, greatly increasing the time adjustment needed for making a set up.

The transition conveyors previously used suffered from some of the same disadvantages, i.e., accurate alignment with the center axes of the feed rollers was not maintained during adjustments, and/or adjustments affected the tensioning of a feed belt, requiring additional separate steps to retension the drive belt.

Accordingly, an object of the present invention is to provide an improved oven mounting for lip rolling machines which greatly facilitates access to the machine for service and adjustment, and for removal of the oven for servicing.

Another object is to provide an improved adjustment mechanism for the guide rod set carried within the oven which renders adjustments quicker and easier while maintaining accurate alignment with the other machine components.

It is yet another object to provide an improved transition conveyor which is easy and quick to adjust for different cup sizes while maintaining accurate alignment, and is removable for easy servicing.

SUMMARY OF THE INVENTION

The above objects and others which will become apparent upon a reading of the following specification and claims are achieved by mounting the oven and guide rods to a oven frame which is releasably locked in an operating position, and which may also be swung back out of the way to allow immediate accessibility to the other components of the machine. The frame is lockable in its swung back position, and in addition may be quickly released for complete removal from the machine. Positioning rests are provided for this purpose, which are positioned on fixed side plates to receive a projecting shaft end at either end of the oven frame, the rests configured to allow the shaft ends to come to rest therein after the oven is swung into position. Coupling sleeves on each rest are then rotated to a position in which the shaft end is captured, securely retaining the oven in either its operating or out of the way position.

Coupling sleeves are also used with the ends of a shaft providing the pivotal mounting of the oven frame, to completely release the pivot shaft ends, and allow the oven frame and oven to be completely removed from the machine.

The guide rods are mounted to the oven frame by two sets of three carrier arms, each set of carrier arms pivoted on a respective end plate at each end of the oven frame. Each carrier arm has a respective guide rod attached at a point spaced from the pivot point by being welded to a partially spherical element of a self aligning bearing accommodating differences in the adjusted position between the opposite ends of the guide rod sets. The carrier arms in each set are interconnected by links so as to move in unison when one arm is pivoted by a handle projecting therefrom. The handle has an adjuster slide mounted thereto with a Bridgeport clamps securing the slide to a threaded rod on which the slide moves when the handle is moved to make adjustments, to fix the handle in a given adjusted position.

The transition conveyor comprises an elongated frame mounting an endless flat belt driven by a pair of pulleys, one at each end of the frame. A pair of guiding side rods are swingable towards or away from the belt to engage and control movement of a stack of cups advanced on the belt, the guiding side rods frictionally clamped to remain in any adjusted position. The front end of the conveyor is adjustable in elevation by a threaded screw, raising support bars coupled to the front end of the conveyor, causing the conveyor to be pivoted about the axis of the rear pulley to allow the cups to be accurately directed into the space between the feed rollers. The conveyor is held on the machine base with quick release pins to allow convenient servicing of the conveyor.

DESCRIPTION OF THE DRAWINGS

FIG. 2 is an inside end view of the oven mounting of the machine of FIG. 1, with the oven halves separated by being pivoted apart.

FIG. 4A is an enlarged sectional front view of the guide rod connections to a respective carrier arm end.

FIG. 4B is a further enlarged fragmentary sectional end view of one of the connections shown in FIG. 4A.

FIG. 8 is a fragmentary view in partial section of the connection between the adjustment mechanism handle, and a slide, Bridgeport spindle clamps, and a threaded rod used to secure one adjusted position.

FIG. 9 is a front view of the slider shown in FIG. 8.

FIG. 13 is a sectional view of the elevation adjuster mechanism included in the transition conveyor shown in FIG. 12.

FIG. 14 is an end view in partial section of the conveyor shown in FIG. 12.

FIG. 15 is an enlarged sectional view of the side guide rod frictional clamping arrangement.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
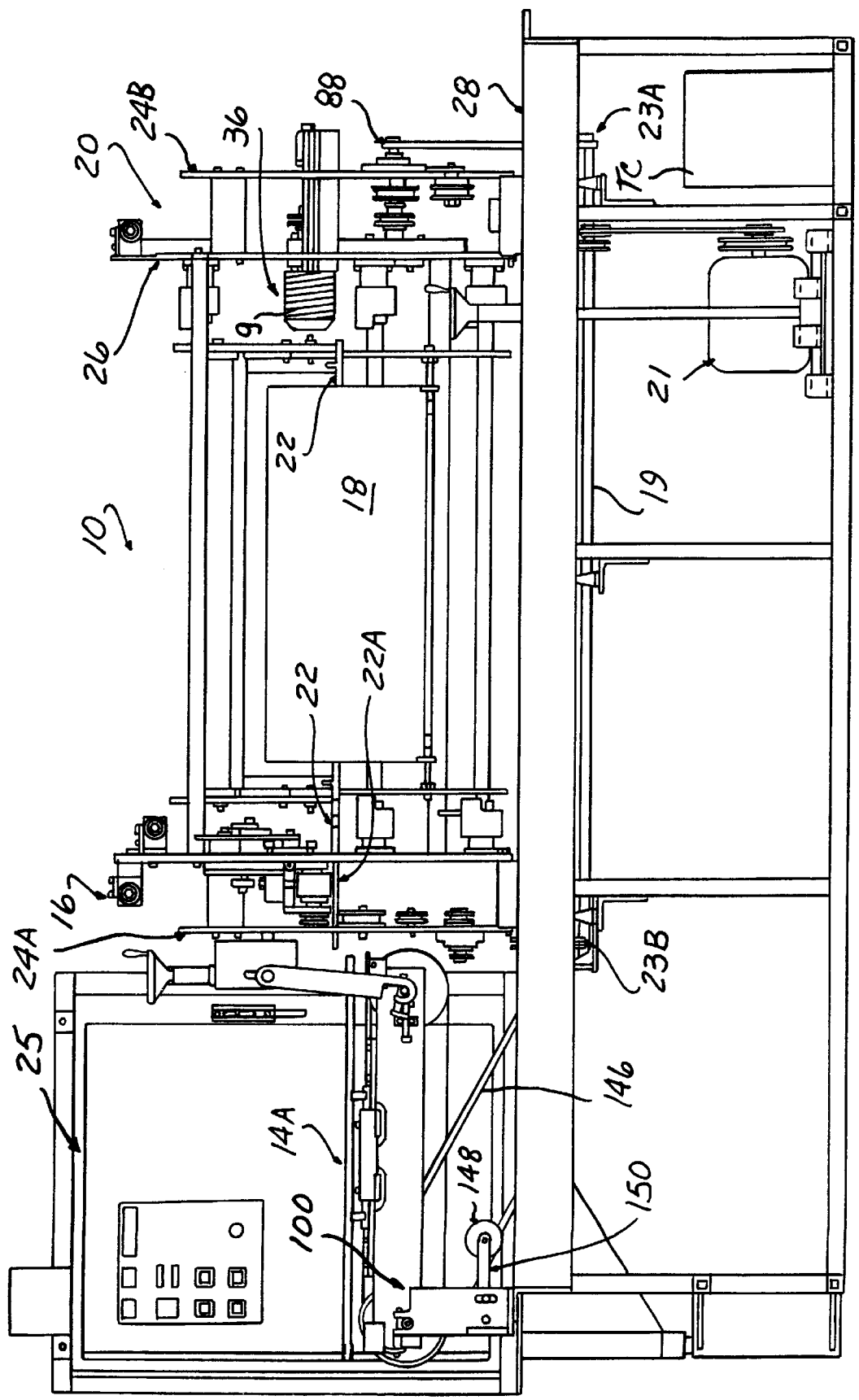
FIG. 1 is a front elevational view of a lip curling machine incorporating the oven guide rod mounting and transition conveyor according to the present invention.

Referring to the drawings, and particularly FIG. 1, a lip rolling machine of the general type shown in U.S. Pat. No. 3,337,919 is shown.

A train of nested cups C (lying on their sides) is supplied from a cup forming machine 12. Typically, accumulating devices (not shown) may be used to insure a constant supply of nested cups to the lip curling machine 10 via a conveyor 14.

A transition conveyor 14A receives the nested cups and feeds them accurately into the center space between a set of feed rollers in a feed roller mechanism 16. The feed roller mechanism 16 comprises a set of rollers each mounted for powered rotation, and with the axes of rotation arranged about the center line of a circle defined by the feed roller outer perimeters, so as to engage the rims of the cups C to rotate the same. The rollers 16 are adjustably tilted slightly out of the plane of the spacing circle to also advance the cups at an accurately controlled feed rate through an oven 18.

The exposed cup rims are heated in the oven 18 to be softened in preparation to being formed by helical grooves in a set of curling screws 36 (FIG. 2) included in the curling screw mechanism 20. The cups are support guided on guide rods 22 while in the lip curling machine 10 to be accurately guided into the feed roller and curling screw mechanisms. The rods 22 may also be adjustable to be fit to each container.

The cup feed rate established by the feed mechanism 16 is finely adjustable to be closely matched to the rate that the cups are processed by the curling screw mechanism 20, as described above. In addition, the diameter of the circular space around which the feed rollers are arranged must be adjustable if the machine 10 is to be used for variously sized cups. The process of adjustment has in the past been carried out separately on each roller, which is slow and results in misalignments. Hence, an improved adjustable feed roller mechanism has been conceived by the present inventor and is described in U.S. Ser. No. 09/203,897 filed on Dec. 2, 1998 Attorney Docket No. BON-111.

An improved adjustable curling screw mechanism has also been devised, in which all of the curling screws are simultaneously adjustable quickly and easily to be matched to different container types, and is described and claimed in U.S. Ser. No. 09,203,896 filed on Dec. 2, 1998 Attorney Docket No. BON-111-1.

Both these adjustments may be made "on the fly", i.e., when the machine is running, in order to more easily determine if a proper adjustment has been accomplished, and to eliminate the need to interrupt production in order to make adjustments.

A single electric motor 21 drives both the feed roller mechanism 16 and the curling screw mechanism 20 via a cross shaft 19 and pulleys 23A, 23B (the drive belts are omitted in FIG. 1).

A control panel 25 is also shown, but coolant connections to the curling screw mechanism 20 are also omitted in this view for clarity. A temperature control unit TC either activates a heater (not shown) or introduces cool water in order to maintain the temperature of the curling screws and guide rods in a proper range. Such temperature controllers are commercially available, a suitable controller being Model TNY4 from AEC (Applied Engineering Co.).

Figure 1A:
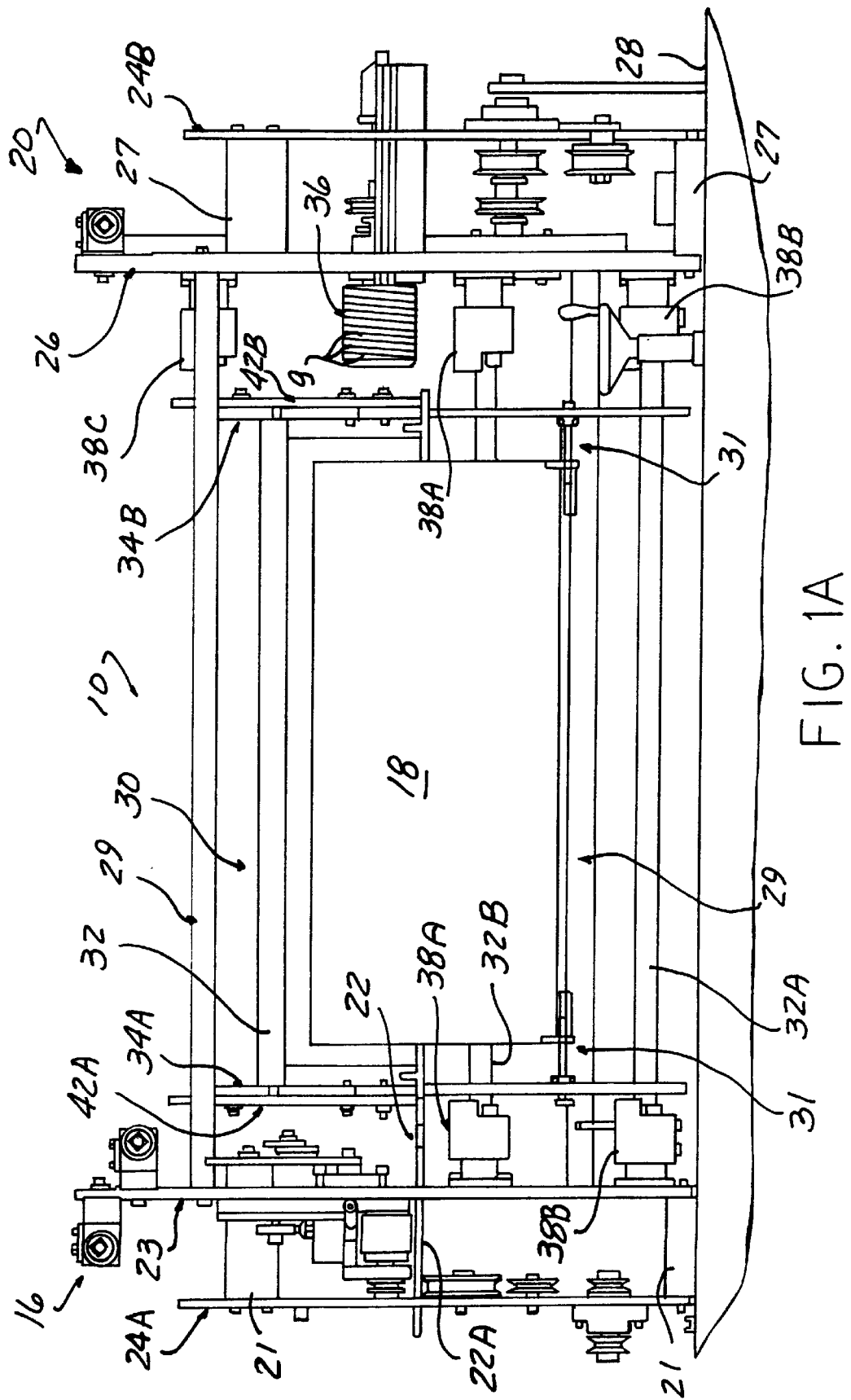
FIG. 1A is an enlarged fragmentary view of a portion of the machine shown in FIG. 1.

FIG. 1A better shows certain details of construction. The feed roller mechanism 16 has components mounted to a left side main plate 23 and end plate 25, connected together by cross tie members 21 and detachably mounted to the machine base 28.

Spacer bars 29 are secured to main plates 23, 27 to properly locate the feed roller mechanism 16 and curling screw mechanism 29.

The particular design of the oven 18 includes a capability for swinging the oven 18 away from its normal operating position, as well as its complete removal, quickly and easily. The oven 18 is supported in an oven frame 30 by connections 31 to the end plates 34A, 34B included in the frame 30.

A series of spacer bars 32, 32A, 32B are attached to oven frame end plates 34A, 34B. Two of the spacer bars 32A, 32B have ends which protrude past each of the oven frame end plates 34A, 34B to be able to be received in pairs of locking connections 38A, 38B, or 38C.

FIG. 2 shows the oven 18 opened, by separating the two halves 18A, 18B in order to access the interior, as for inspecting the posture of the cup stack "C" on the guide rods 22 extending through the interior of the oven 18, or to clear jams, etc.

A clamshell oven opening mechanism is used, which is very well known in the art and details are therefore not here set forth.

The oven 18 has an annular shape, with a circular lengthwise extending opening defined between the two halves 18A, 18B.

Heater elements (not shown) are arranged about the inside of the opening in order to heat the cup rims as they are advanced past the heater elements, the cups sliding along a set of three guide rods 22.

Figure 3:
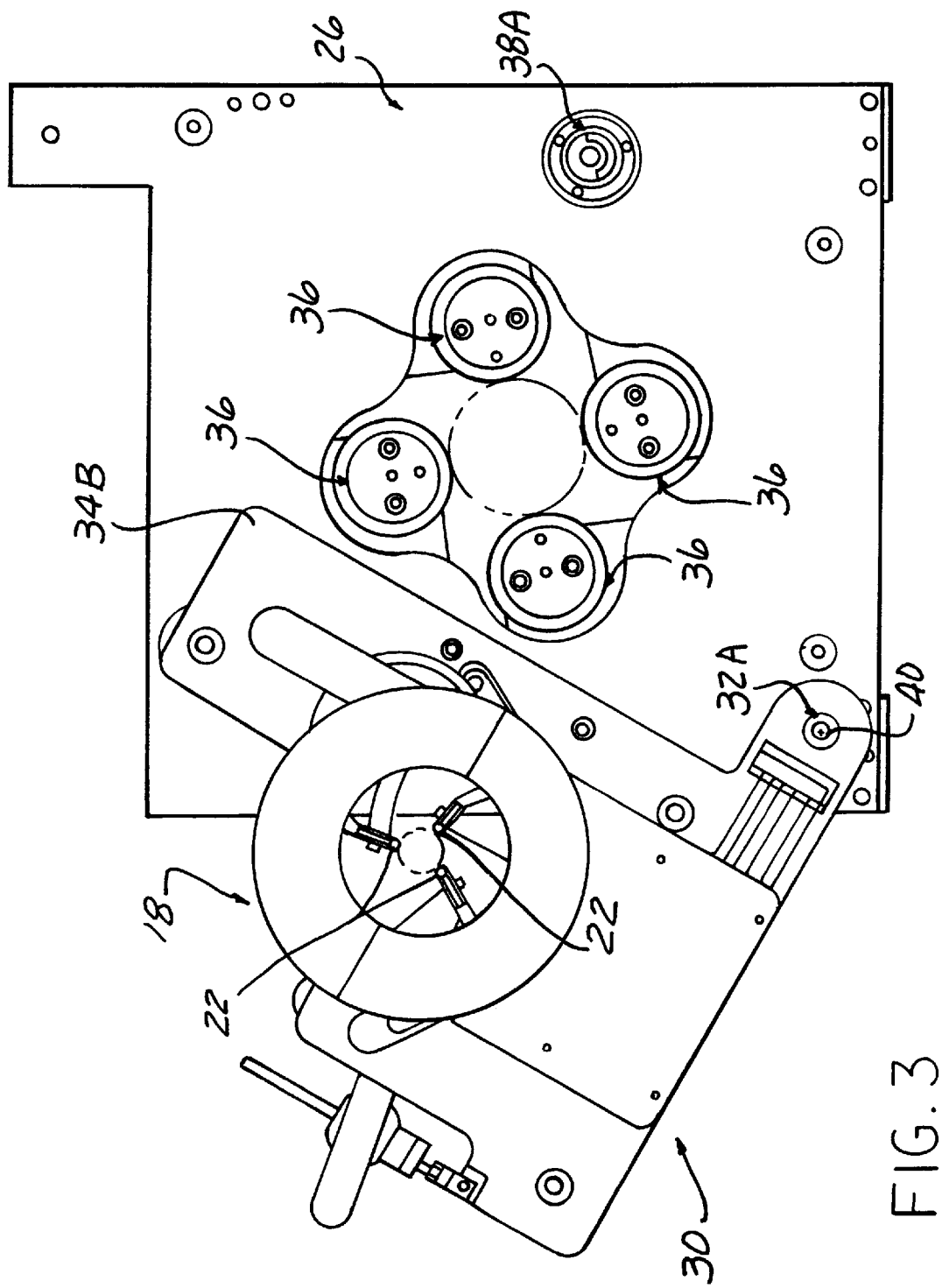
FIG. 3 is an inside end view of the oven mounting looking towards the curling screws, showing the oven swung back out of the operative position.

The oven frame 30 is pivoted at 40 by ends of the lower, rear shaft 32A, enabling swinging about an axis at the rear of the machine 10 in order to allow the oven 18, guide rods 22 and two guide rod adjustment mechanisms 42A, 42B carried by respective oven frame plates 34A, 34B to be swung away from the normal operating position to the position shown in FIG. 3.

This allows ready convenient access to the other machine components by getting the oven 18 out of the way to obviate the need to wait for cooling of the oven 18 and guide rods 22 before adjusting or servicing these other components.

The oven 18 is supported in each position by the pairs of locking connections 38A, 38B.

In the operative, lowered position, the protruding ends of shaft 32B are held in the locking connections 38A while in the swung back position are held in locking connections 38C.

The pivoting occurs about lower shaft 32A, with protruding ends thereof held in the lower locking connections 38C.

Figure 10:
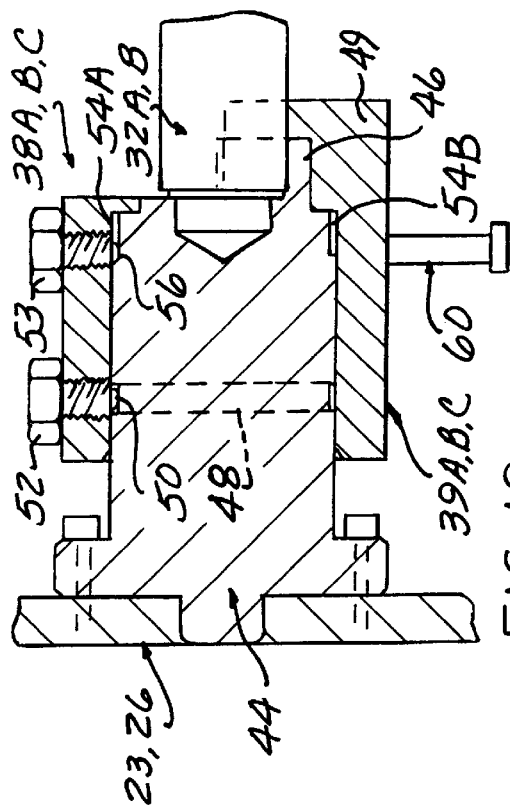
FIG. 10 is a sectional view of one of the coupling sleeves and fixed cylindrical rests used to secure the oven frame in different positions in the lip curling machine, with the coupling sleeve shown in the receiving or released condition.
Figure 11:
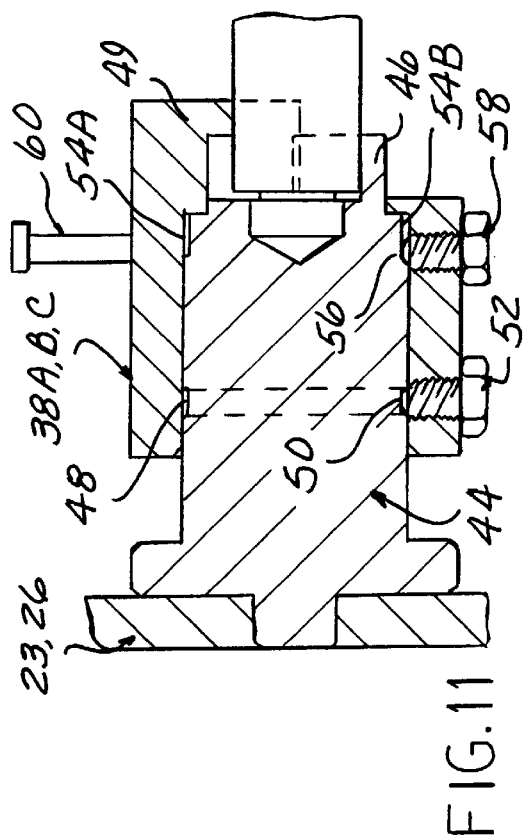
FIG. 11 is the same view as FIG. 10 but with the coupling sleeve rotated to its locked or capturing position.
Figure 6:
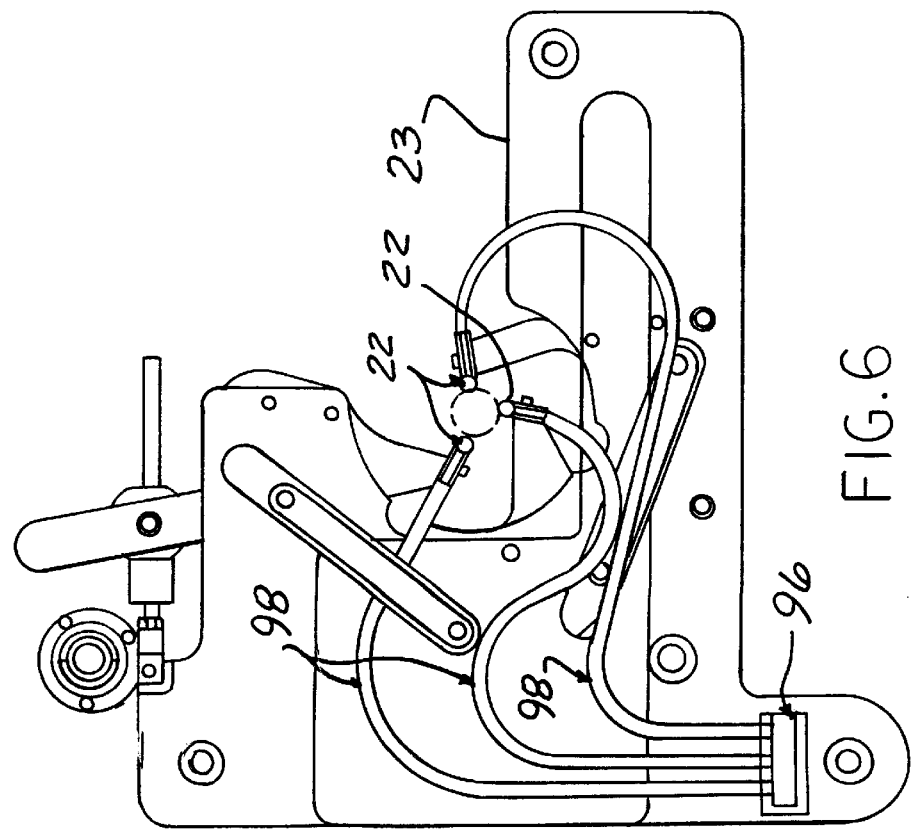
FIG. 6 is an inside end view looking right of the right hand oven from end plate showing the coolant lines and connections to the guide rods.

FIGS. 10–11 show details of each of the locking connections 38A, B, C, which are each identical.

The end of shafts 32A, B are able to be received into a rest 46 comprised of a lower half portion protruding from one end of a cylindrical base 44 fixed with screws to the adjacent main plate 23 or 26.

The base 44 has a groove 48 located to receive a spring loaded ball 50 in the end of the set screw 52 carried by coupling sleeves 39A, B, C, and a pair of oppositely located slots 54A, 54B at the end thereof adopted to seat a spring loaded ball 56 in set screw 58 also carried by coupling sleeves 39A, B, C.

The coupling sleeves 39A, B, C are rotated 180° (with the use of a bolt 60 as a handle) with a protruding half portion 49 extending axially over the cylinder base protruding portion 46 overlie protruding base portion to capture the ends of the shaft 32A, 32B. Detents are provided by slots 54A and 54B in either the open or locked positions. Release of both ends of both shafts 32A, B allows the oven 18 to be hoisted completely out of the machine 10.

FIGS. 4–7 shows further details of the guide rod adjusting mechanisms 42A, 42B, which are of substantially the same configuration, although in left and right hand versions.

Figure 4:
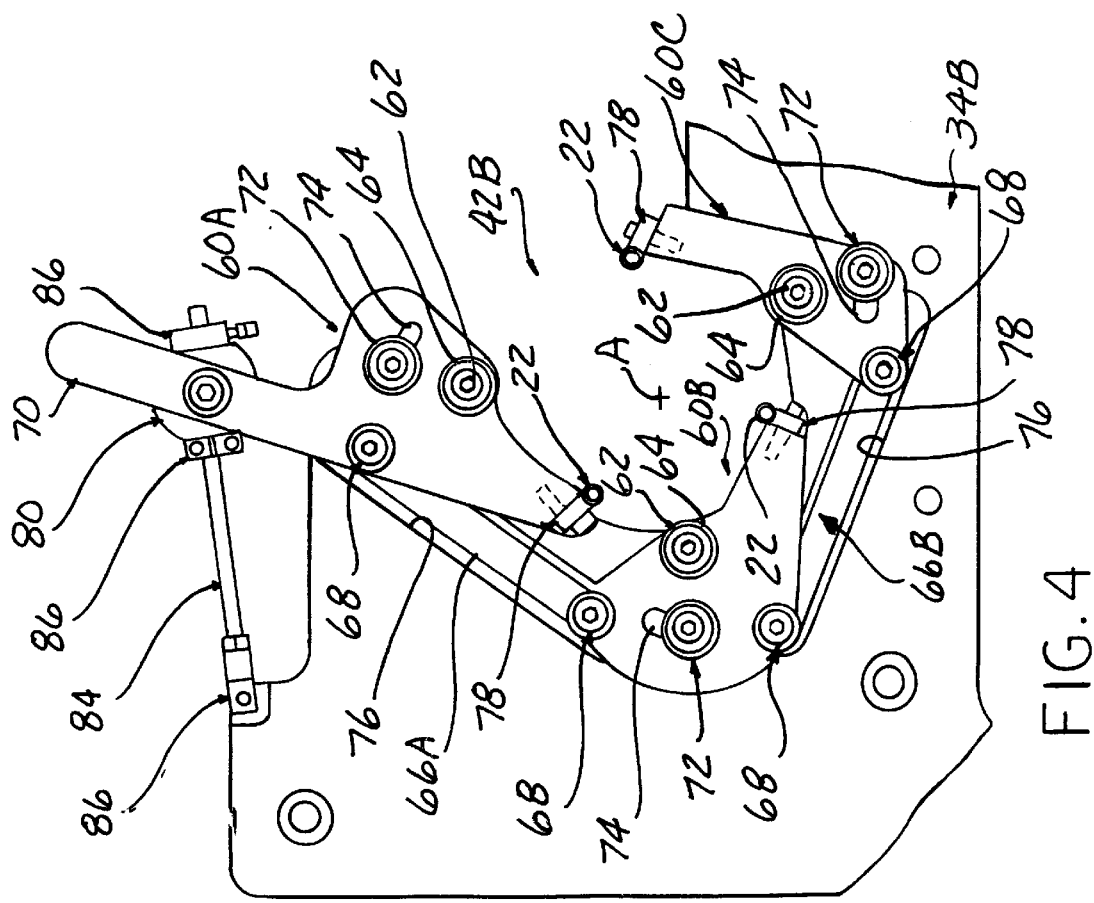
FIG. 4 is an end view looking to the right of the oven support from the right hand end plate showing the right hand guide rod adjustment mechanism.

FIG. 4 shows the right side guide rod mechanism 42B which comprises three carrier arms 60A, B, C, each pivotally mounted to oven frame end plate 34A by shoulder bolts 62 and spring and die washer set 64 at an intermediate location. A pair of links 66A, B interconnect the arms 60A, B, C to cause them to pivot in unison with each other, with shoulder bolt washer sets 68 provided for the purpose of establishing pivoted connections thereto.

Each of the carrier arms 60A, B, C have one end of a guide rod 22 mounted to an outboard end thereof. Arm 60A has an adjusting handle 70 projecting upwardly to be accessible from a point above the machine 10.

Another shoulder bolt washer set 72 is installed in slots 74 to stabilize each of the arms 60A, B, C.

The links 66A, B are disposed in respective slots 76A, B cut into the end plate 34B, while the arms 60A, B, C are positioned against the inside of the oven frame end plate 34B.

The guide rods 22, which are hollow to allow circulation of coolant therethrough, are attached at one end of a respective carrier arm 60A, B, C by being welded to an outer race of a hemispherical self aligning bearing 78 secured thereto.

As the handle 70 is moved, the connected ends of the guide rods 22 are moved along an arc "B" (as indicated in phantom FIG. 7) as the arms 60A, B, C are correspondingly pivoted.

Figure 7A:
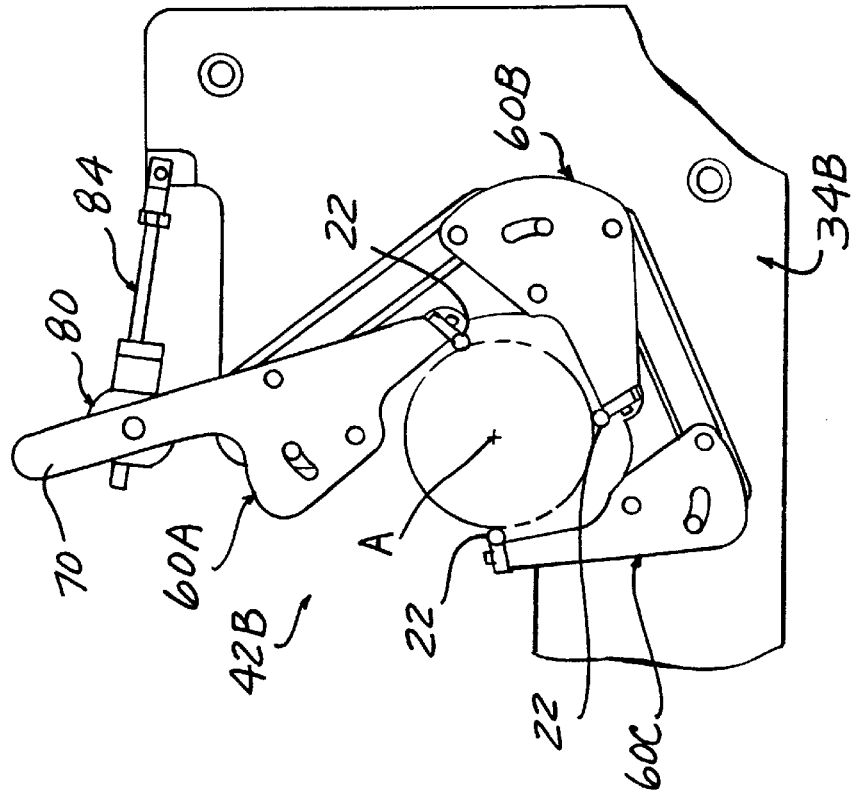
FIG. 7A is an outside end view looking left of the oven mounting frame right hand end plate showing the guide rod adjustment mechanism at a maximum diameter setting.
Figure 7:
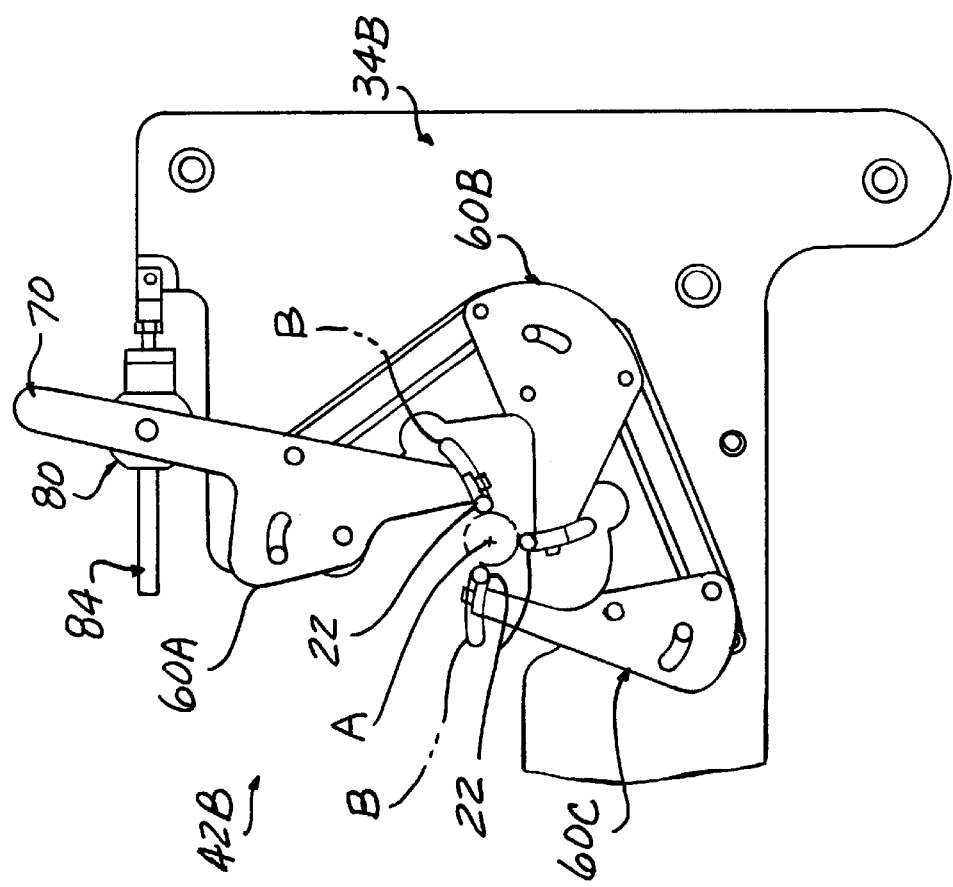
FIG. 7 is an outside end view looking left of the oven mounting frame right hand end plate showing the guide rod adjustment mechanism at a minimum diameter setting.
Figure 12:
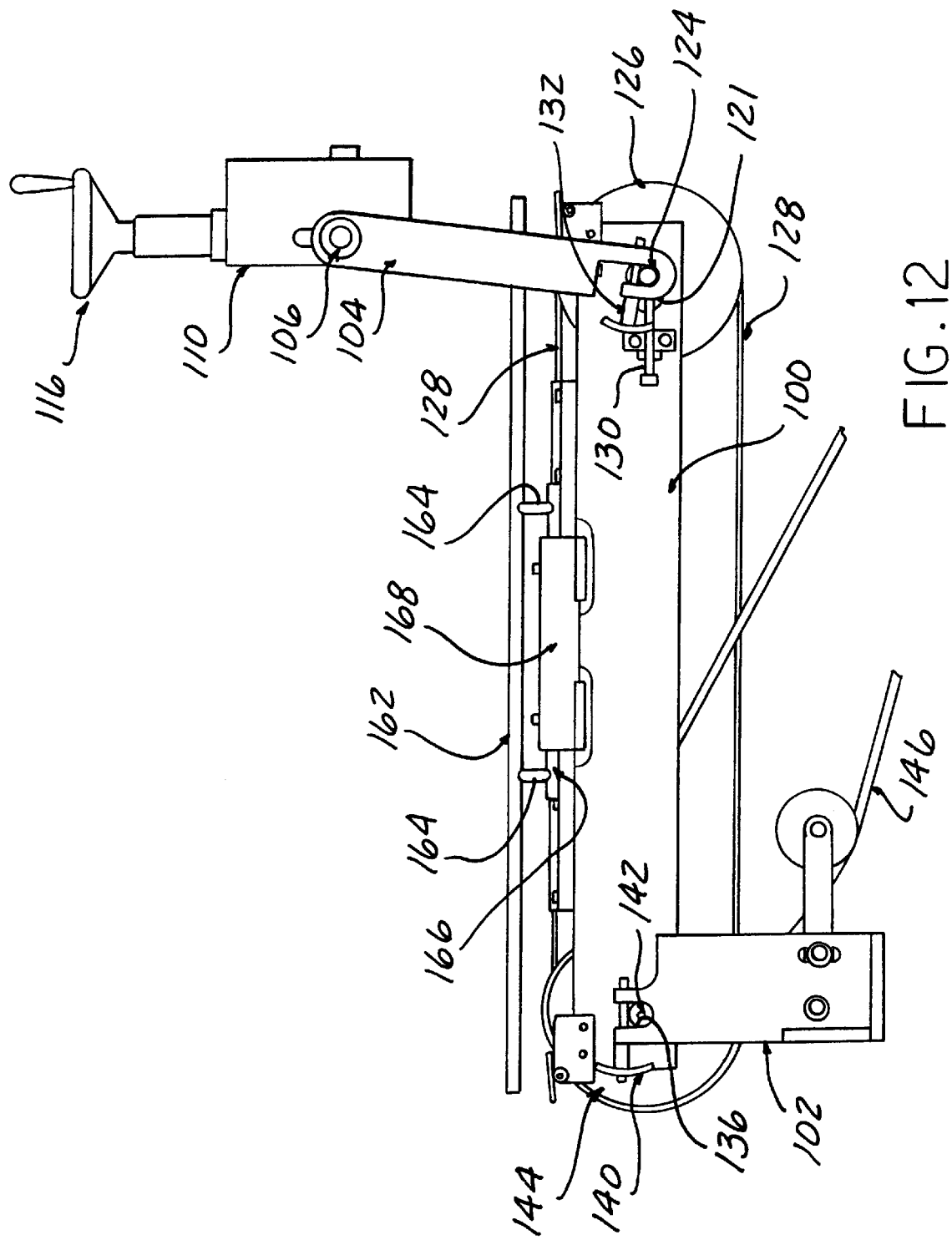
FIG. 12 is a front view of the transition conveyor.

This varies the radial spacing from a center "A" of the space between the guide rods 22, accommodating different sized cups (See FIGS. 7, 7A).

The handle 70 has a slider 80 pivotally mounted thereto, the slider 80 having a cross bore 82 (FIG. 8) which slidably receives a threaded stop rod 84. Stop rod 84 has a clevis end 86 pinned to end plate 34B.

The handle 70 thus moves along the rod 84 in making adjustments to achieve proper cup guidance. Any adjusted position is secured by a pair of Bridgeport spindle clamps 86, having internal threaded jaws placed against either flattened side 88 of the slider 80 and clamped to the threads on the rod 84 in similar fashion to their well known use on threaded stops for spindles.

Figure 5:
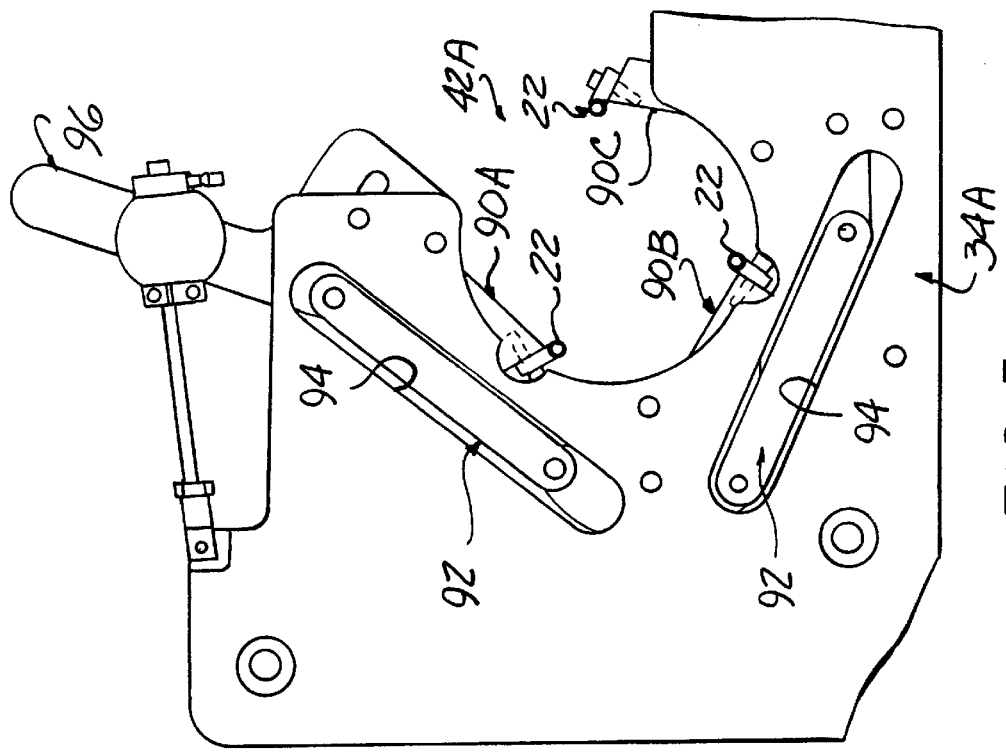
FIG. 5 is an end view looking to the right of the left hand oven support frame left hand end plate showing the left hand guide rod adjusting mechanism.

FIG. 5 is a reverse view of the other guide rod adjustment mechanism 42A, which also includes arms 90A, B, C to which the other ends of the guide rods 22 are attached.

The arms 90A, B, C are pivoted to end plate 34A, with links 92 received in slots 94 in the end plate 34A. A handle 96 integral with arm 90A allows pivoting of all of the arms 90A, B, C in unison to move the ends of the control rods 22 radially in or out to adjust the spacing to achieve proper guidance of the cup stack.

Each of the guide rod adjustment mechanisms 42A, B are individually adjustable, such that a size difference may be set at respective ends of the guide rods 22. This difference is sometimes desirable as the rims after being heated sometimes require a slightly greater spacing.

Coolant from the temperature control unit TC is caused to circulate through each of the guide rods via a manifold 96 mounted to each feed plate 34A, 34B and reinforced hoses 98 connected to fittings 99 (FIG. 4A).

The curling screw end of each guide rod 22 is attached to a respective arm 60 by a hemispherical ball end 89 allowing limited tilting to accommodate independent adjustment of each end of the guide rods 22. A ball 91 is attached to the arm 60 with a screw 93, and several spring washers 95. An outer race 97 is welded to an end of a guide rod 22.

The feed roller end of each of the guide rods 22 is welded to a slotted plate 103 receiving a screw 105 to be secured to a respective carrier arm 90 which accommodates thermal growth. A threaded plug 107 allows connection of guide rod extensions 22a (FIGS. 1, 1A) extending through the feed roller mechanism 16.

FIGS. 12–16 provide details of the transition conveyor 14A, which accurately directs a cup stack received from the forming machine into the feed roller mechanism 16. The conveyor 14A includes a pair of parallel side plates 100 supported at the left end (FIG. 1) by a stanchion 102 fixed to the machine base 28, and at the right end by a pair of hanger bars 104 positioned by a slider 108 (FIG. 13) having shoulder bolts 106 each projecting through a holder in the upper end of a respective bar 104.

A bracket 110 affixed to end plate 25 supports the slider 108 for vertical adjusting movement, slots 112 in bracket plates 114 accommodating the bolts 106.

A handwheel 116 is connected to enable rotation of a threaded shaft 118 received in a threaded bore 120 in slider 108.

The lower end of the hanger bars 104 are hooked to pins 122, each in turn projecting through a slot 121 in a respective side plate 100 to support the same. An elongated bolt 124 acts as an axle for rotatably mounting a pulley 126 around which a flat belt 128 passes. Tensioner bolts 130 (FIG. 12) act on pins 122 to force the axle bolt 124 to the rear to set a proper tension in the belt 128.

A pair of quick release pins 132 extend over the bolt 124 and pin 122 and when removed allow the side plates 100 and supported components to be lifted out of the hooks formed in the lower ends of the links 104.

The stanchion 102 similarly has pins 134 held in grooves 136 in side walls 138 by quick release pins 140, such that side plates 100 can be completely freed when pins 132, 140 are removed.

An axle bolt 142 rotatably supports a second pulley 144 around which the belt 128 is passed. Pulley 144 is driven by a vee belt 146, powered by pulley 23B and a right angle drive (not shown). A tensioner idler pulley 148 mounted on a swing arm 150 (FIG. 1).

A pair of parallel side guide bars 162 are frictionally mounted for swinging adjustment to confine variously sized cups as shown in FIG. 16. Pairs of parts 164 are welded to each guide bar 162 and to a positioner rod 166. Frictional clamping of each positioner rod 166 is achieved by L-shaped members 168 having one leg 170 extending over the positioner rod 166 to frictionally engage the same. Clamping screws 172 draw the leg 170 down against the rod 166 to a degree dependent on the extent of tightening of the screws 172. The screws 172 are received in threaded holes 174 in a support plate 176 which also is engaged by leg 178 of the L-shaped member 168.

The positioner rod 166 rests in a groove 180 in top plate 182 so as to enable a frictional securement to be achieved sufficient to hold the side guide bars 162 in any adjusted position.

The raising of the right end of the side plates 100 pivots those plates about the axis of the pulley 144 such that the tension of the flat belt 128 is not affected by adjustments for variously sized cups.

The flat belt 128 rides on top plate 182 and acts to drive the cup stack into the feed roller mechanism 16, the left end raised to direct the cups into the exact center of the feed roller space.

Accordingly, the improvements described herein contribute to the ease and speed of setting up a lip curling machine of the type described.

What is claimed is:

1. In a lip rolling machine for forming a lip on the rim of a molded container of a type including a feed mechanism for advancing nested containers between a set of curling screws, with an oven for heating the rims of said containers located between said feed mechanism and said curling screws, said oven having a lengthwise opening through which said nested containers are advanced on a set of guide rods, wherein the improvement comprises an oven mounting having a first position locating said oven in an operating position to accept said nested containers, and a second position in which said oven is swung away from said operating position to enable access to machine components adjacent said oven.

2. The lip rolling machine according to claim 1 wherein said oven mounting includes an oven frame on which said oven is mounted, said oven frame pivoted on a fixed structure included in said lip curling machine to be able to be swung out of said operating position.

3. The lip rolling machine according to claim 2 wherein said oven frame is lockable in both said operative and swung back positions.

4. The lip rolling machine according to claim 2 wherein said oven frame includes an end plate at each end thereof, with said oven held between said end plates and a plurality of elongated members attached at either end to said oven frame end plates.

5. The lip rolling machine according to claim 4 wherein one of said elongated members is pivotally supported on said fixed structure to enable said oven to be swung away.

6. The lip rolling machine according to claim 5 wherein said fixed structure comprises a pair of spaced apart main plates fixedly mounted in said lip curling machine said oven frame disposed between said main plates, said one of said elongated members extending to a pivotal support on each of said main plates.

7. The lip rolling machine according to claim 6 wherein another of said elongated members has opposite ends extending past said oven frame respective end plates, each end of said another elongated member associated with two sets of aligned locking connections on each of said main plates, each set of locking connections located to selectively secure said oven in said operating and said swung back positions by locking engagement with said ends of said another elongated member.

8. The lip rolling machine according to claim 7 wherein said locking connections each include a fixed rest into which said another elongated member ends move when said oven frame is swung into said swung back and operating positions, and further including a coupling sleeve rotatable and configured to capture a respective end on a respective rest in a rotated position thereon.

9. The lip rolling machine according to claim 4 wherein said lip rolling machine further includes a set of guide rods extending through said oven opening for guiding said nested containers advanced through said oven opening, said set of guide rods supported at either end to a respective oven frame end plate.

10. The lip rolling machine according to claim 4 further including a guide rod spacing adjustment mechanism for each respective end of said guide rods, each mechanism enabling selective adjustment of the spacing of a respective end of said set of guide rods, said adjustment mechanisms each carried by a respective oven frame end plate.

11. The lip rolling machine according to claim 10 wherein each adjustment mechanism comprises a plurality of arms having a pivotal connection to a respective end plate, each arm carrying one end of a respective guide rod, at a location spaced from said pivotal connection such as to swing said guide rod end radially in or out to adjust the spacing of said ends.

12. The lip rolling machine according to claim 11 further including a link interconnection between said arms causing pivotal motion of said arms to be in unison, whereby each of the ends at one or the other end of said guide rod set moves radially in or out in the same way as other ends at the same end of said set upon pivoting of one of said arms at either end of said guide rod set.

13. The lip rolling machine according to claim 12 wherein said link interconnection comprises a series of links connected to adjacent arm pairs, each link recessed into a slot in an adjacent oven frame end plate, each arm pivoted oven adjacent oven frame end plate.

14. The lip rolling machine according to claim 12 wherein one of said arms at each end of said guide rod set has a handle projecting therefrom allowing manual pivoting of an associated set of arms at a respective end of said guide rod set.

15. The lip rolling machine according to claim 14 further including an elongated stop member adjacent each handle past which said respective handles swung in making adjustments, and a selectively engageable lock associated with each handle preventing relative movement after an adjustment is made.

16. The lip rolling machine according to claim 15 wherein said elongated stop member is threaded, said handle carries structure having a hole formed thereon through which said stop member passes, said lock including a pair of clamps engageable on each said of said hole to engage said thread on said member and said handle carried structure.

17. The lip rolling machine according to claim 8 wherein said oven frame and oven is completely detachable by release of said locking assemblies and said pivotal mounting.

18. In a lip rolling machine forming a lip on a rim of a container of the type including a feed roller mechanism, for advancing nested containers through an oven and thereafter into a curling screw mechanism, the improvement comprising:

a transition conveyor comprising a pair of parallel side plates extending along the length of said conveyor supporting a belt pulley at each end, a flat belt passing around both belt pulleys and along a top plate to enable carrying nested containers along the length of said side plates; said one end of said conveyor positioned adjacent said feed mechanism to direct containers thereinto; an elevation adjusting mechanism operatively engaged with said one end to enable selective adjustment to accommodate the advance of varyingly sized containers;

the opposite end of said conveyor supported for pivoting about the axis of one of said pulleys located at said opposite ends.

19. The lip rolling machine according to claim 18 wherein said transition conveyor further includes a pair of parallel side guide bars, each extending along one side of said conveyor, said guide bars each support on an adjuster rod spaced below an associated guide rod for swinging adjustment of said associated side guide bars towards or away from the other guide bar, thereby enabling adjustment of the spacing and height thereof.

20. The lip rolling machine according to claim 19 wherein said side guide bars are frictionally held to be positioned in any adjusted position.

21. The lip rolling machine according to claim 18 wherein said conveyor is held by quick release pins as to be removable from said lip rolling machine upon removal of said quick release pins.

22. A lip rolling machine of the type including a feed roller mechanism for advancing a train of nested containers into a preheating oven included in said machine, with a set of guide rods guiding said containers during said advance through said machine, the improvement comprising:

a guide rod spacing adjustment mechanism for each respective end of said guide rods, each mechanism enabling selective adjustment of the spacing of a respective end of said set of guide rods, said adjustment mechanisms each carried by an oven frame end plate at either end of said oven, and wherein each adjustment mechanism comprises a plurality of carrier arms, each having a pivotal connection to a respective oven end plate, each arm carrying one end of a respective guide rod, at a location spaced from said pivotal connection of said associated arm such as to swing said carried guide rod end radially in or out to adjust the spacing of said end.

23. The lip rolling machine according to claim 22 further including a link interconnection between said arms causing pivotal motion of said arms to be in unison, whereby each of the ends at one or the other end of said guide rod set moves radially in or out in the same way as other ends at the same end of said set upon pivoting of one of said arms at either end of said guide rod set.

24. The lip rolling machine according to claim 23 wherein said link interconnection comprises a series of links connected to adjacent arm pairs, each link recessed into a slot in an adjacent oven frame end plate, each arm pivoted oven adjacent oven frame end plate.

25. The lip rolling machine according to claim 23 wherein one of said arms at each end of said guide rod set has a handle projecting therefrom allowing manual pivoting of an associated set of arms at a respective end of said guide rod set.

26. The lip rolling machine according to claim 25 further including an elongated stop member adjacent each handle past which said respective handles swung in making adjustments, and a selectively engageable lock associated with each handle preventing relative movement after an adjustment is made.

27. The lip rolling machine according to claim 26 wherein said elongated stop member is threaded, said handle carries structure having a hole formed thereon through which said stop member passes, said lock including a pair of Bridgeport clamps engageable on each side of said hole to engage said thread on said member and said handle carried structure.

* * * * *

UNITED STATES PATENT AND TRADEMARK OFFICE
CERTIFICATE OF CORRECTION

PATENT NO. : 6,093,010
DATED : July 25, 2000
INVENTOR(S) : Wayne W. Lamson

It is certified that error appears in the above-identified patent and that said Letters Patent is hereby corrected as shown below:

Column 2, line 17, after "guide rods to" delete "a", insert therefor --an--.

Column 2, line 45, delete "a".

Column 4, line 35, delete "09,203,896", insert therefor --09/203,896--.

Column 4, line 57, delete "25", insert therefor --24A--.

Column 4, line 60, delete "27", insert therefor --26--.

Column 9, line 23, delete "swung", insert therefor --swing--.

Column 9, line 14, delete "oven" (second occurrence), insert therefor --to an--.

Column 9, line 31, after "on each" delete "said", insert therefor --side--.

Column 10, line 40, after "arm pivoted" delete "oven", insert therefor --to an--.

Signed and Sealed this

Fifteenth Day of May, 2001

Attest:

NICHOLAS P. GODICI

Attesting Officer     Acting Director of the United States Patent and Trademark Office